United States Patent [19]

Batiuk

[11] 4,288,269

[45] Sep. 8, 1981

[54] REMOVAL OF PROTECTIVE PAPER TAPE AND MASKANTS

[75] Inventor: Walter Batiuk, Seattle, Wash.

[73] Assignee: Boeing Aerospace Co., Seattle, Wash.

[21] Appl. No.: 106,232

[22] Filed: Dec. 21, 1979

[51] Int. Cl.³ .............................................. B32B 13/00
[52] U.S. Cl. ..................................... 156/344; 134/38; 252/364
[58] Field of Search ....................... 156/344, 236, 155; 427/154, 155, 156; 134/38; 252/364

[56] References Cited

U.S. PATENT DOCUMENTS 3,179,609  4/1965  Morison ................................. 134/38
3,355,385  11/1967  Mackley ................................ 134/38

*Primary Examiner*—Sam Silverberg

*Attorney, Agent, or Firm*—David L. Garrison; Robert L. Gullette

[57] ABSTRACT

Protective paper adhesively bonded to stainless steel surfaces is removed by applying an aqueous solvent mixture containing a ketone or similar solvent, alcohol, toluene, and a wetting agent, all of which are maintained in a single phase. The relative composition of the solvent components is maintained on the area of solvent application by covering with a suitable airtight cover. The single-phase solvent mixture penetrates the paper and adhesive, and the vapor pressure of the solvent mixture causes the paper and adhesive to blister and loosen. The paper is peeled off after sufficient time elapses. Any remaining adhesive can be removed with a second solvent containing a ketone and toluene.

5 Claims, No Drawings

REMOVAL OF PROTECTIVE PAPER TAPE AND MASKANTS

BACKGROUND OF THE INVENTION

1. Field of the Invention

This invention relates to a solvent for loosening and removal of protective surfaces on metals, glasses, plastic, etc., and further relates to a process and composition for removal of protective paper and organic films from the surface of polished metal objects.

2. Description of the Prior Art

Polished metal surfaces such as stainless steel, aluminum, etc. are generally protected during shipment and handling by the application of paper and polymer sheets with an adhesive so that the highly polished metal sheets are protected from scratches, gouges, abrasion and other damage during shipment and during fabrication of the metal into their end usage devices, such as tanks or other similar equipment. Large stainless steel plates used in the fabrication of water storage tanks for the nuclear industry have one surface which is highly polished, usually at the mill. The surface must be properly protected to avoid mechanical and environmental damage in transit to the fabricator or installation site. A paper tape is routinely applied by the polishing vendor and frequently, after transit, may arrive at the work site wet and also may have been exposed to substantial amounts of sunlight and other agents which cause the adhesive-backed paper to become more adherent, tacky or otherwise difficult to remove mechanically. Normal removal by peeling the paper is frequently not possible. The stainless steel plates often remain on the job site for several months, or sometimes years, before and after fabrication into tanks or the like, during which time additional exposure to the elements occurs. This usually results in rendering the paper or other film protective surface most difficult to remove. Various individual solvents have been used in the prior art to attempt to soften and remove the paper or plastic coating, but proved to be ineffective. The solvents would evaporate before they could successfully act upon the adhesive. In addition, many of the solvents utilized contain halogens including fluorine, chlorine and iodine which may result in intergranular corrosion of the stainless steel, or the solvents may contain sulfates which with water form sulfuric or sulfurous acid and can cause chemical attack upon the stainless steel. Such chemical attack on the stainless steel surfaces cannot be tolerated in the tanks being constructed for the nuclear industry. In addition, the method of applying the solvents in the prior art permit selective evaporation of components of the solvent mixture so that within a few minutes the solvent may separate into two phases and be rendered ineffective. Frequently it has been found that mechanical means such as peeling by hand, etc., when applied to freshly applied manufactured paper covered plates of stainless steel, are quite workable; but, extended exposure of the plates with their coating to sunlight and other environmental agents cause the adhesive to be relatively inert or fixed so that they resist removal by normal means.

SUMMARY OF THE INVENTION

It is an object of this invention to provide a method of removing protective paper and organic protective films from surfaces such as highly polished metal, glass, inert plastics, and the like.

It is another object of this invention to provide a multicomponent, single-phase, solvent system useful in the removal of organic protective coatings, sometimes classified as maskants, from metal surfaces.

It is a further object of this invention to provide a method and composition of matter useful in the removal of protective surface coatings from polished metal surfaces in which a multicomponent, single-phase, solvent system contains components exerting substantial vapor pressure which penetrate and partially lift the protective coating from the surface while the relative composition of the various components of the solvent system are maintained on the surface being treated in substantially constant relative ratios throughout the process whereby the solvent remains a single phase liquid.

Protective paper adhesively bonded to stainless steel surfaces is removed by applying a single-phase solution composed of an aqueous/solvent mixture containing water, ethyl alcohol, toluene, and methyl ethyl ketone (or other ketones having a relatively high vapor pressure). The relative composition of the solvent mixture is maintained on the adhesive-backed paper being treated for removal by covering and sealing with a suitable vaportight cover. The single-phase solvent mixture penetrates the paper and at least partially solubilizes the adhesive and, due to the vapor pressure of the solvent mixture, releases the adhesive-bonded paper from the surface—partially in the form of blisters—thus permitting the easy removal of the paper from its substrate. The solvent soaking period of 5–15 minutes is normally sufficient to accomplish the above task. Any residual adhesive can be removed by a second solvent containing, basically, toluene and one of the ketones.

DESCRIPTION OF THE PREFERRED EMBODIMENT

To remove protective coatings from polished metal or other surfaces, a solvent mixture is applied to the paper or maskant coated surface of a polished metal. A first solvent mixture containing a lower aliphatic alcohol such as methyl or ethyl alcohol, a ketone such as acetone, butyl acetate or methyl ethyl ketone in deionized water with a wetting agent is used. The wetting agent is a sulfate and halogen-free agent such as polyethylene glycol, or other suitable non-ionic wetting agents such as sulfate-free detergents or the like.

Solvent mixtures suitable for use here fall within the following composition ranges:

| Component | Workable[1] Range % | Preferred Embodiment |
|---|---|---|
| a ketone | 50–70 | 64 |
| lower aliphatic alcohol | 10–20 | 13 |
| toluene | 5–10 | 10 |
| deionized wetting agent | 1–10 | 3 |
| deionized water | 5–10 | 10 |

[1]Ratios of ingredients are chosen within the stated ranges to provide a single phase mixture.
(All figures above given in volume percentages.)

The foregoing solvent mixtures are applied to the paper or maskant surface such as by moistened cloth, brush or spraying. The wetted surface is immediately covered over with a suitable vapor barrier such as a plastic or other cover. Examples of such covers include polyethylene sheets covering the surface and sealed to the surface with masking tape to prevent evaporation of the components of the solvent. The solvent penetrates the paper and at least partially solubilizes the adhesive. The vapor pressure exerted by the components of the solvent then causes the paper and adhesive to blister and release from the metal surface. The composition of the solvent is chosen so that it partially solubilizes the adhesive and softens it thus minimizing the separation of the adhesive from the paper. The adhesive-backed paper is then stripped from the surface, occasionally with the aid of a suitable scraping tool such as an acrylic scraper chosen to prevent scratching or other damage to the polished surface. Frequently, portions of the adhesive used to apply the protective paper will remain adhered to the metal surface and must be removed by a further step of applying a suitable solvent solution containing methyl ethyl ketone, toluene and alcohol. Care must be taken in applying the second solution to avoid abrading the polished surface of the stainless steel plate.

EXAMPLE 1

Stainless steel plates having one surface thereof polished and coated for shipment with an adhesive-backed paper protective covering by the manufacturer were cut into the desired shapes and welded into a tank. The protective paper could not be peeled from the surface readily by mechanical means, by chemical agents or solvents heretofore known due to prior applications of heat and other environmental conditions over prolonged time periods. A paper-removal solvent was prepared by combining the following components in the order listed:

| Component | Amount | Percentage |
|---|---|---|
| methyl ethyl ketone | 2500 ml | 64 |
| ethanol | 500 ml | 13 |
| toluene | 400 ml | 10 |
| polyethylene glycol | 100 ml | 3 |
| deionized water | 400 ml | 10 |
| | 3900 | 100 |

The above mixture formed a single-phase solvent having a substantial vapor pressure, the various components each contributing to the vapor pressure of the paper removal solvent as well as to the ability of the solvent mixture to solubilize the adhesive.

The solvent noted above was applied liberally to the surface of the protective paper and the treated surface was immediately covered over with a film of polyethylene. The edges of the plastic sheet were securely taped down with masking tape. Approximately ⅛ pint of the solvent noted above was applied to a 2'×4' papered area before the covering of the polyethylene sheet was applied and sealed along the edges with masking tape. The solvent was permitted to soak through the paper for approximately 10 minutes during which time an adjacent 2'×4' area was being treated with the solvent and covered with a polyethylene sheet in a similar manner. The first area treated showed extensive lifting and blistering of the paper from the metal surface.

The polyethylene sheet and the paper was then removed from the first area treated with the aid of an acrylic scraper. The paper, before removal, was blistered and hanging loosely from the metal surface in many areas and was readily removable from the surface with the scraper. The removed solvent-soaked paper was disposed of in a water-filled steel drum to avoid contamination of the work area with solvent vapors and to minimize a fire hazard. The paper on the second area was then similarly stripped and placed in a water-filled container for disposal. Additional areas were treated and the paper removed with the entire surface eventually exposed.

In some areas of the stainless steel surface a residue of adhesive remained. A second solvent solution was prepared for removal of the residue. The second solvent was composed of the following components:

| Component | Amount |
|---|---|
| methyl ethyl ketone | 1000 ml |
| ethanol | 1000 ml |
| toluene | 1000 ml |

After removing all traces of water from the areas being cleaned a small quantity of the second solvent solution was applied to the surface on a polyethylene foam scouring pad. Any type of non-abrasive scouring pad or cloth applicator could be utilized. The surface on which the residue remained was gently rubbed with the scouring pad and the residue readily removed. The entire operation required approximately 15–30 minutes for an 8' square section, whereas the prior-art removal process frequently required in excess of one man-hour per square foot.

EXAMPLE 2

Preparatory to shipping and handling, windowpane glass often receives a masking tape covering or crisscross pattern of masking tape to prevent scratching and marring of the glass surface. Removal of the tape can often be done without the use of scrapers or solvents, when the tape is removed within several days of its application and the tape and glass have not been exposed to adverse environmental conditions such as alternate wetting and heating. If there has been heating or wetting of the tape and glass, however, the solutions and process described in the preferred embodiment can be used to greatly facilitate removal of the masking tape.

For treatment of a glass surface with adherent adhesive-backed tape thereon, a solution consisting essentially of the following ingredients by volume was prepared:

| Component | Percentage |
|---|---|
| a ketone from the group of methyl ethyl ketone, acetone and butyl acetone | 50–70 |
| a lower aliphatic alcohol | 10–20 |
| toluene | 5–10 |
| a non-ionic wetting agent from the group of propylene glycol, NH$_4$OH or a sulfate-free detergent | 1–10 |
| deionized water | 5–10 |

The solvent mixture prepared as set forth above was applied to a glass surface with old masking tape thereon and the treated area covered with an airtight cover or sheet to prevent evaporation of the solution. The airtight cover maintained the composition of the solvent mixture and promoted the buildup of vapor pressure blisters between the glass and tape. Selective evaporation of the solvent components was avoided so that the solvent mixture remained a single phase. The airtight cover was removed when the tape blistered and loosened, and the tape was quickly scraped off with a nonabrasive scraper. Where needed, a second solution consisting of toluene, ethanol and methyl ethyl ketone was used to remove residual masking tape adhesive.

Although in the examples given of the foregoing process only limited areas were treated, it is apparent that larger treatment areas could be handled, for example, by using a reusable shield having a self-sealing edge structure in place of the plastic film utilized. Similarly, other surfaces having difficulty adhering to adhesive-packed surface protectants and maskants can be efficaciously treated by the process of this invention.

I claim:

1. A method for the removal of adhesively-bound protective paper from a substrate, comprising:

applying a single-phase solvent solution that penetrates the paper and adhesive consisting essentially of by volume:

| | |
|---|---|
| a ketone from the group of methyl ethyl ketone, acetone, butyl acetone | 50-70% |
| a lower aliphatic alcohol | 10-20% |
| toluene | 5-10% |
| a non-ionic wetting agent from the group of propylene glycol, NH$_4$OH or a sulfate-free detergent | 1-10% |
| deionized water | 5-10% | immediately covering the treated area of with a vaportight barrier sheet sealed about its periphery to prevent selective evaporation of components of said solvent solution thereby maintaining said solvent solution in a single phase until the organic coating or maskant loosens and blisters from the solvent action and vapor pressure of the single-phase solution, removing said barrier, and mechanically removing said adhesively-bound protective paper from the substrate.

2. A method for the removal of adhesively-bound protective paper from polished stainless steel which has no corrosive effect on the stainless steel, comprising the steps of:

manually peeling away any loose paper or, making a liberal application of a solution on a volume basis, the solution consisting essentially of:

| | |
|---|---|
| a ketone | 50-70% |
| lower aliphatic alcohol | 10-20% |
| toluene | 5-10% |
| deionized wetting agent | 1-10% |
| deionized water | 5-10% |

(All figures above given in volume percentages.)

quickly covering the treated area with a vaportight barrier sheet and sealing the edges thereof to prevent selective evaporation of constituents of said solution and to maintain said solution in a single phase, maintaining said sheet in vaportight relation to said surface until said solution penetrates said protective paper and adhesive to blister and loosen said protective paper, removing said sheet, rapidly scraping the blistered and loose protective paper until all protective paper is removed, and drying the treated area thoroughly.

3. The method of claim 2 wherein the adhesive left after the paper itself has been removed is removed by repeating the application of the solution of claim 2 to the treated area to remove any residual adhesive.

4. The method of claim 2 wherein the adhesive which remains after said protective paper has been removed is removed by the process of applying a solution of:

| | |
|---|---|
| methyl ethyl ketone | 10-50% by volume |
| toluene | 10-33% by volume |
| ethanol | 10-50% by volume | to the treated area and scrubbing with a nonabrasive brush.

5. The method of claim 1 wherein the solution used consists of, on a volume basis:

| | |
|---|---|
| methyl ethyl ketone | 64% |
| ethanol | 13% |
| toluene | 10% |
| propylene glycol | 3% |
| deionized water | 10%. |

* * * * *